US012762183B2

(12) United States Patent
Kwak et al.

(10) Patent No.: US 12,762,183 B2
(45) Date of Patent: Oct. 13, 2026

(54) VIRTUAL TABULAR DATA GENERATION METHOD AND SERVER PERFORMING THE SAME

(71) Applicant: KAKAOBANK CORP., Seongnam-si (KR)

(72) Inventors: Young Jun Kwak, Seongnam-si (KR); Jung Min Son, Seongnam-si (KR); Su Bin Kim, Seongnam-si (KR)

(73) Assignee: KAKAOBANK CORP., Seongnam-si (KR)

(*) Notice: Subject to any disclaimer, the term of this patent is extended or adjusted under 35 U.S.C. 154(b) by 0 days.

(21) Appl. No.: 19/065,417

(22) Filed: Feb. 27, 2025

(65) Prior Publication Data

US 2025/0284739 A1 Sep. 11, 2025

(30) Foreign Application Priority Data

Mar. 11, 2024 (KR) ........................ 10-2024-0033751

(51) Int. Cl.
*G06F 16/21* (2019.01)
*G06F 16/901* (2019.01)

(52) U.S. Cl.
CPC ........ *G06F 16/9017* (2019.01); *G06F 16/211* (2019.01)

(58) Field of Classification Search
None
See application file for complete search history.

(56) References Cited

U.S. PATENT DOCUMENTS

2007/0088726 A1 4/2007 Daos et al.
2017/0091082 A1 3/2017 Ooshima et al.
2020/0012933 A1 1/2020 Truong et al.
2021/0191908 A1 6/2021 Lott
2023/0252005 A1* 8/2023 Park .................... G06F 16/2282 707/803
2024/0202167 A1* 6/2024 Hoang ................... G06N 3/088

(Continued)

FOREIGN PATENT DOCUMENTS

KR 20230118269 A 8/2023

OTHER PUBLICATIONS

Lopez-Rojas, Edgar & Stefan Axelsson, "Using the RetSim Fraud Simulation Tool to Set Thresholds for Triage of Retail Fraud", 2015, Springer International, NordSec 2015, LNCS 9417, pp. 156-171. (Year: 2015).*

(Continued)

*Primary Examiner* — Scott A. Waldron
(74) *Attorney, Agent, or Firm* — Perilla Knox & Hildebrandt LLP; Thomas B. Hildebrandt

(57) ABSTRACT

A method of generating virtual tabular data, performed on a server using a deep-learning module, comprising: generating a first prompt for generating a table schema, calibrating a table schema by comparing the table schema generated based on the first prompt with a predefined reference table schema, generating a second prompt by referring to the calibrated table schema, generating table condition data for first tabular data generated based on the second prompt, generating a third prompt by referring to the table condition data and the calibrated table schema, and deriving final tabular data through a verification operation on second tabular data generated based on the third prompt.

19 Claims, 16 Drawing Sheets

(56) References Cited

U.S. PATENT DOCUMENTS

| | | | | |
|---|---|---|---|---|
| 2025/0068965 | A1* | 2/2025 | Frank | G06F 16/2282 |
| 2025/0265423 | A1* | 8/2025 | Portisch | G06F 16/901 |

OTHER PUBLICATIONS

Kim, et al., "Expertise-Centric Prompting Framework for Financial Tabular Data Generation using Pre-trained Large Language Models", published Oct. 10, 2024, NeurIPS 2024 Third Table Representation Learning Workshop, 17 pages. (Year: 2024).*

Office Action for Korean Application No. 10-2024-0033751 mailed Feb. 9, 2026. (machine translation).

Notice for Eligibility of Grant for Singapore Application No. 10202500451U mailed Apr. 15, 2026.

Search Report for Singapore Application No. 10202500451U mailed Apr. 10, 2026.

Wu et al.; "AI Chains: Transparent and Controllable Human-AI Interaction by Chaining Large Language Model Prompts" arXiv:2110.01691v3 [cs.HC] Mar. 17, 2022.

* cited by examiner

FIG. 4

| | Date | Amount | Merchant |
|---|---|---|---|
| S | | | |

<A1>

| | Date | Amount | Merchant | Inqury Type | Online Pay | Regular Pay | Ratio of Point | Point |
|---|---|---|---|---|---|---|---|---|
| S' | | | | | | | | |
| V1 | 07.08 | $45.49 | Netflix | Online | Apple Pay | OTT | 0.002 | $0.09098 |

<A2>

$C_{b1}$ $C_{u1}$ $C_{b2}$ $C_{b3}$

| | Date | Amount | Merchant | Inqury Type | Online Pay | Regular Pay | Ratio of Point | Point |
|---|---|---|---|---|---|---|---|---|
| S' | | | | | | | | |
| V1 | 07.08 | $45.49 | Netflix | Online | Apple Pay | OTT | 0.002 | $0.09098 |
| V2 | 09.01 | $89.99 | Gym | Online | Venmo | Y | 0.002 | $0.17998 |
| ⋮ | | | | | ... | | | |
| Vn | 10.21 | $201.99 | Nike | Offline | - | - | 0.001 | $0.220199 |

<A3>

VIRTUAL TABULAR DATA GENERATION METHOD AND SERVER PERFORMING THE SAME

CROSS-REFERENCE TO RELATED APPLICATION

This application claims priority under 35 U.S.C. § 119 to Korean Patent Application No. 10-2024-0033751 filed on Mar. 11, 2024, in the Korean Intellectual Property Office, the entire contents of which are hereby incorporated by reference.

TECHNICAL FIELD

The disclosure relates to a virtual tabular data generation method and a server performing the same. More particularly, the disclosure relates to a method of generating highly specialized virtual data related to a topic desired by a user through prompting for a deep-learning model.

BACKGROUND

The contents set forth in this section merely provide background information on the present embodiments and do not constitute prior art.

Recently, as financial institutions or electronic financial companies offer financial products and services via computing devices, financial transactions conducted online without users having to meet face-to-face with employees of financial institutions or electronic financial companies are on the rise. As such non-face-to-face transactions increase, the importance of technology for accurately and quickly processing users' sensitive information (e.g., personal information, financial information, etc.) is increasing day by day.

In addition, various services that incorporate AI and machine learning technologies are being rapidly developed recently in the financial industry as well. In this case, in order for users or developers to output the data they want, a large amount of training data for training a deep-learning module (e.g., an LLM (large language model) or a PLM (pre-trained language model)) is needed.

However, since financial institutions handle documents related to sensitive user information, data containing users' sensitive information data cannot be used as training data as it is. To resolve this issue, financial institutions were able to use roundabout methods of replacing users' sensitive information data with data that had already been made public, but there was a problem that the public data available in this case had a low relevance with actual user data and could not contribute to improving the performance of the deep-learning module.

SUMMARY

It is an object of the present disclosure to provide a method of generating virtual tabular data that can generate highly accurate data available to improve the performance of business models for new services by replacing data containing sensitive information of customers.

In addition, it is an object of the present disclosure to provide a method of generating virtual tabular data that can verify and correct generated data so that the generated data has accuracy and diversity higher than a predetermined reference value and can reflect the characteristics of sensitive information data.

Further, it is an object of the present disclosure to provide a method of generating virtual tabular data that can generate highly accurate data that fits a data schema requested by a user by automatically updating a prompt for generating virtual tabular data over a plurality of times.

The objects of the present disclosure are not limited to the objects mentioned above, and other objects and advantages of the present disclosure that have not been mentioned can be understood by the following description and will be more clearly understood by the embodiments of the present disclosure. Moreover, it will be readily appreciated that the objects and advantages of the present disclosure can be realized by the means set forth in the claims and combinations thereof.

According to some aspects of the disclosure, a method of generating virtual tabular data, performed on a server using a deep-learning module, comprises: generating a first prompt for generating a table schema, calibrating a table schema by comparing the table schema generated based on the first prompt with a predefined reference table schema, generating a second prompt by referring to the calibrated table schema, generating table condition data for first tabular data generated based on the second prompt, generating a third prompt by referring to the table condition data and the calibrated table schema, and deriving final tabular data through a verification operation on second tabular data generated based on the third prompt.

According to some aspects, the calibrating the table schema comprises: applying the first prompt to the deep-learning module and receiving the table schema as an output of the deep-learning module; comparing the table schema with the predefined reference table schema; and calibrating the table schema to include an item included in the predefined reference table schema if the table schema does not include the item.

According to some aspects, the generating the first prompt comprises: receiving a data generation request including information on tabular data desired by a user from a user terminal linked with the server; and generating the first prompt based on information included in the data generation request.

According to some aspects, the generating the second prompt comprises generating the second prompt by referring to the calibrated table schema and the data generation request together, and the generating the third prompt comprises generating the third prompt by referring to all of the table condition data, the calibrated table schema, and the data generation request.

According to some aspects, the generating the table condition data comprises: applying the second prompt to the deep-learning module and receiving the first tabular data as an output of the deep-learning module; and generating the table condition data by comparing each column included in the first tabular data with predefined condition data.

According to some aspects, the table condition data comprises a unary constraint or a binary constraint for each column included in tabular data, and the unary constraint refers to a condition of having one of predetermined values, and the binary constraint refers to a condition of including an operational expression with another column.

According to some aspects, the deriving the final tabular data comprises: applying the third prompt to the deep-learning module and receiving the second tabular data as an output of the deep-learning module; applying the second tabular data to a data verification module and obtaining a data evaluation result as an output of the data verification module; and determining the final tabular data based on the data evaluation result.

According to some aspects, the second tabular data comprises a greater number of example data than the first tabular data, and wherein the data verification module: performs diversity verification on the example data included in the second tabular data, and performs constraint satisfaction verification on columns to which a unary constraint or a binary constraint is applied in the example data.

According to some aspects, wherein the obtaining the data evaluation result comprises: deriving a first evaluation value for diversity of each row data or each column data included in the second tabular data; deriving a second evaluation value for whether each column data included in the second tabular data satisfies a unary constraint; deriving a third evaluation value for whether each column data included in the second tabular data satisfies a binary constraint; and determining whether reference values for the first to third evaluation values are satisfied, and generating the data evaluation result including a result thereof.

According to some aspects, the determining the final tabular data comprises: correcting data included in the second tabular data that do not satisfy the reference values to values that satisfy the reference values; and determining the second tabular data with corrections reflected as the final tabular data.

According to some aspects, correcting the third prompt based on the data evaluation result; regenerating the second tabular data by applying the corrected third prompt to the deep-learning module; applying the regenerated second tabular data to the data verification module and re-obtaining the data evaluation result as an output of the data verification module; and determining the final tabular data based on the re-obtained data evaluation result.

According to some aspects of the disclosure, a server comprises: a processor, a memory configured to load a computer program executed by the processor, and a database configured to store data generated in an execution process of the computer program, wherein the computer program comprises: generating a first prompt for generating a table schema, calibrating a table schema by comparing the table schema generated based on the first prompt with a predefined reference table schema, generating a second prompt by referring to the calibrated table schema, generating table condition data for first tabular data generated based on the second prompt, generating a third prompt by referring to the table condition data and the calibrated table schema, deriving final tabular data through a verification operation on second tabular data generated based on the third prompt, and storing the final tabular data in the database.

According to some aspects, the calibrating the table schema comprises: applying the first prompt to the deep-learning module and receiving the table schema as an output of the deep-learning module; comparing the table schema with the predefined reference table schema; and calibrating the table schema to include an item included in the predefined reference table schema if the table schema does not include the item, wherein the generating the table condition data comprises: applying the second prompt to the deep-learning module and receiving the first tabular data as an output of the deep-learning module; and generating the table condition data by comparing each column included in the first tabular data with predefined condition data, and wherein the deriving the final tabular data comprises: applying the third prompt to the deep-learning module and receiving the second tabular data as an output of the deep-learning module; applying the second tabular data to a data verification module loaded into the memory and obtaining a data evaluation result as an output of the data verification module; and determining the final tabular data based on the data evaluation result.

According to some aspects, the obtaining the data evaluation result comprises: deriving a first evaluation value for diversity of each row data or each column data included in the second tabular data; deriving a second evaluation value for whether each column data included in the second tabular data satisfies a unary constraint; deriving a third evaluation value for whether each column data included in the second tabular data satisfies a binary constraint; and determining whether reference values for the first to third evaluation values are satisfied, and generating the data evaluation result including a result thereof.

According to some aspects, a computer-readable recording medium having recorded thereon a program capable of executing the method set forth in any one of claims 1 to 11.

The method of generating virtual tabular data of the present disclosure can generate highly accurate virtual data that can replace data containing sensitive information on customers (hereinafter, sensitive information data), and can generate virtual data to fit the form of a table schema desired by a user. Thereby, developers or workers can improve the performance of business models by utilizing highly accurate virtual data to test or train business models applicable to new services.

In addition, the virtual tabular data generated through the present disclosure can generate virtual data that can have accuracy and diversity higher than the predetermined reference value and can reflect the characteristics of sensitive information data through the data verification and correction process. Thereby, the present disclosure can solve the security issue of sensitive information data, and at the same time, generate data in a form desired by the user and utilize this to operate business models.

Furthermore, the present disclosure can generate highly accurate tabular data requested by a user by automatically updating the prompts for generating virtual tabular data over a plurality of times. Thereby, the present disclosure can increase the work efficiency of developers or workers and optimize the resources required for developing new services or analyzing existing services by omitting or automating the data collection process required for developing new services.

In addition to the contents described above, specific effects of the present disclosure will be described together while describing specific details for carrying out the present disclosure below.

BRIEF DESCRIPTION OF THE DRAWINGS

FIG. 4 is a diagram for describing one example of a process of generating tabular data performed in each step of FIG. 3.

DETAILED DESCRIPTION OF THE PREFERRED EMBODIMENTS

Figure 1:
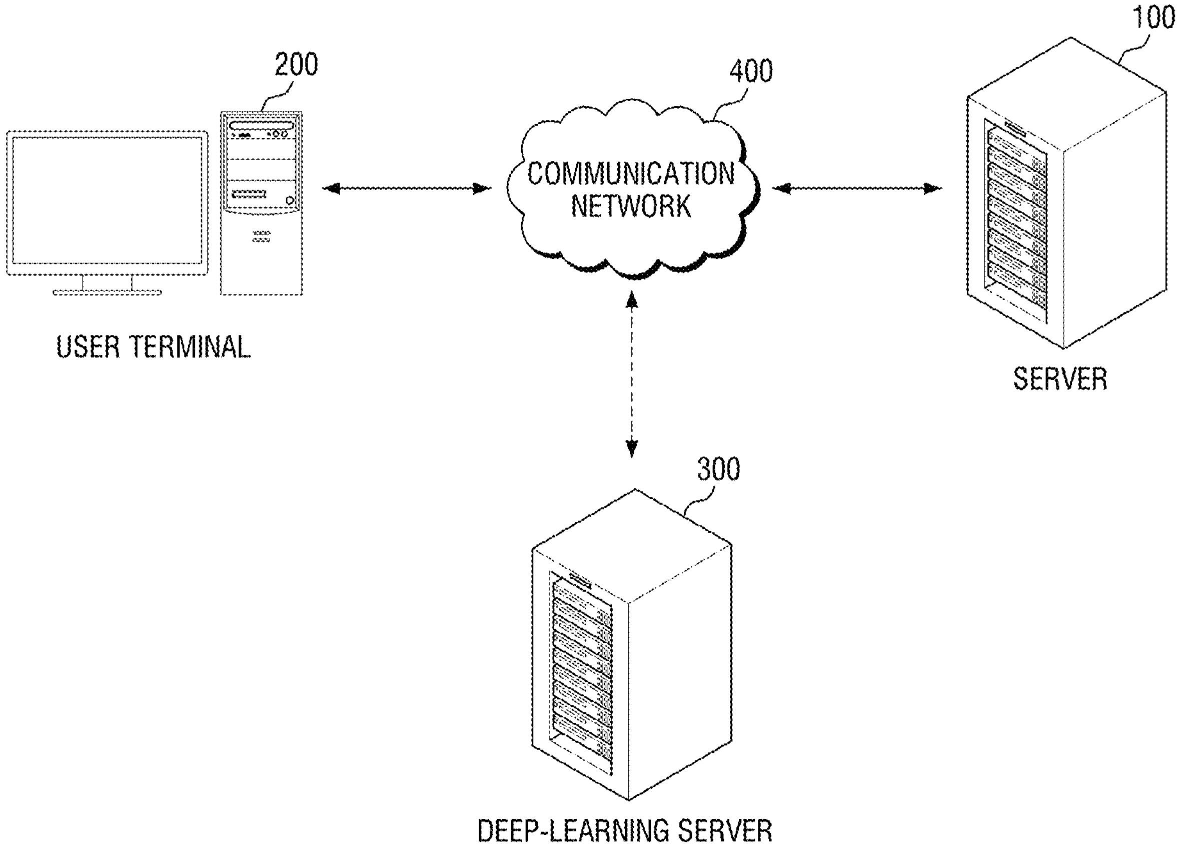
FIG. 1 is a conceptual diagram for describing a virtual tabular data generation system according to some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Further, machine learning is a field of developing algorithms and technologies that allow computers to be trained based on data as one field of AI, is a core technology in various fields such as data processing, image recognition, voice recognition, and Internet search, and exhibits excellent performance in deriving relevant information and generating new data.

Hereinafter, a method of generating virtual tabular data and a server performing the same according to some embodiments of the present disclosure will be discussed with reference to FIGS. 1 to 16.

FIG. 1 is a conceptual diagram for describing a virtual tabular data generation system according to some embodiments of the present disclosure.

Referring to FIG. 1, the virtual tabular data generation system according to some embodiments of the present disclosure includes a server 100 and a user terminal 200. In addition, the virtual tabular data generation system may further include a deep-learning server 300 in some embodiments. Here, the server 100 may operate in conjunction with the user terminal 200 or the deep-learning server 300 via a communication network 400, and transmit and receive data to and from the user terminal 200 or the deep-learning server 300.

First, the server 100 may generate data requested by the user terminal 200 by using a deep-learning model. At this time, the user terminal 200 may transfer a data generation request including information on the type (e.g., financial data) and format (e.g., tabular data) of data desired by the user to the server 100.

For example, the data requested by the user terminal 200 may include personal information, financial activity information, etc. In this case, the financial activity information may include information on financial products such as deposits, savings, loans, etc., and information on customer spending patterns such as card payment history, etc. However, this is merely one example, and the present disclosure is not limited thereto.

In the following, an example in which the user terminal 200 has requested "financial data" in the form of tabular data from the server 100 will be described for the convenience of description.

The server 100 may generate a prompt reflecting the data generation request received from the user terminal 200, and apply it to a pre-trained deep-learning model to thereby generate virtual tabular data. At this time, the server 100 performs an operation of updating the prompt over a plurality of times in order to obtain more accurate tabular data.

Here, the "virtual tabular data" includes virtual data generated by the deep-learning model, unlike real data on particular users or anonymous data related to anonymous users. In some embodiments of the present disclosure, the data generated by the deep-learning model is not limited to tabular data.

However, a description will be given by taking an example in which the deep-learning model of the present disclosure generates virtual tabular data in the following for the convenience of description. In addition, the virtual tabular data and the tabular data will be used interchangeably herein to refer to the same meaning.

The virtual tabular data generated by the server 100 can have a very high similarity to real data (e.g., financial data including sensitive personal information), and may include realistic and specialized up-to-date financial activity information. The virtual tabular data generated by the server 100 may be widely used for conducting simulation tests on new financial products, for research on improving the performance of new business models, etc. A detailed description of a method of generating virtual tabular data performed by the server 100 will be given later.

Further, the user terminal 200 may refer to a terminal used by a user (e.g., an administrator or operator) and capable of operating an application in a wired or wireless communication environment. The user terminal 200 may include various forms of electronic devices, such as, for example, a personal computer (PC), a laptop, a tablet PC, a mobile phone, a smartphone, and a wearable device (e.g., a watch-type terminal). Moreover, the user terminal 200 may not refer to one particular terminal but may be used as a sense to generally refer to various electronic devices used by the user.

The communication network 400 serves to connect the server 100 and the user terminal 200. In other words, the communication network 400 refers to a communication network that provides an access path so that the user terminal 200 can transmit and receive data after accessing the server 100. The communication network 400 may encompass, for instance, wired networks such as LANs (local area networks), WANs (wide area networks), MANs (metropolitan area networks), ISDNs (integrated services digital networks), or wireless networks such as wireless LANs, CDMA, Bluetooth, and satellite communications, but the scope of the present disclosure is not limited thereto.

Further, in some embodiments of the present disclosure, the server 100 may operate together with the deep-learning server 300 and generate the virtual tabular data described above. In this case, the deep-learning server 300 may be a device (or server) that specializes in operating a deep-learning model including a neural network trained to generate virtual tabular data. According to some embodiments, the deep-learning server 300 may utilize a transformer model based on an encoder-decoder structure. For example, the deep-learning server 300 may use an open-source artificial intelligence model such as ChatGPT.

Here, the server 100 and the deep-learning server 300 may each be configured in separate devices, or may also be configured to be included in the same hardware system. In this case, the server 100 or the deep-learning server 300 may each be implemented in at least one of a workstation, a data center, an Internet data center (IDC), a direct attached storage (DAS) system, a storage area network (SAN) system, a network attached storage (NAS) system, a redundant array of inexpensive disks or a redundant array of independent disks (RAID) system, and an electronic document management (EDMS) system, but the present embodiment is not limited thereto.

In other words, the method of generating virtual tabular data according to some embodiments of the present disclosure may be implemented only in the server 100, or may be implemented in the server 100 and the deep-learning server 300 together.

In addition, the management entities of the server 100 and the deep-learning server 300 may be the same or different from each other. For example, a particular financial institution may manage and operate the server 100 and the deep-learning server 300 together. As another example, the management entities of the server 100 and the deep-learning server 300 may be different from each other, in which case the deep-learning server 300 may refer to an external server such as a ChatGPT server, etc.

However, a description will be given by taking an example in which the execution entity of the method of generating virtual tabular data according to some embodiments of the present disclosure is the server 100, and the deep-learning model used in the present disclosure uses a module included in the server 100 in the following for the convenience of description. In the following, the respective components and modules of the server 100 will be described with reference to FIG. 2.

Figure 2:
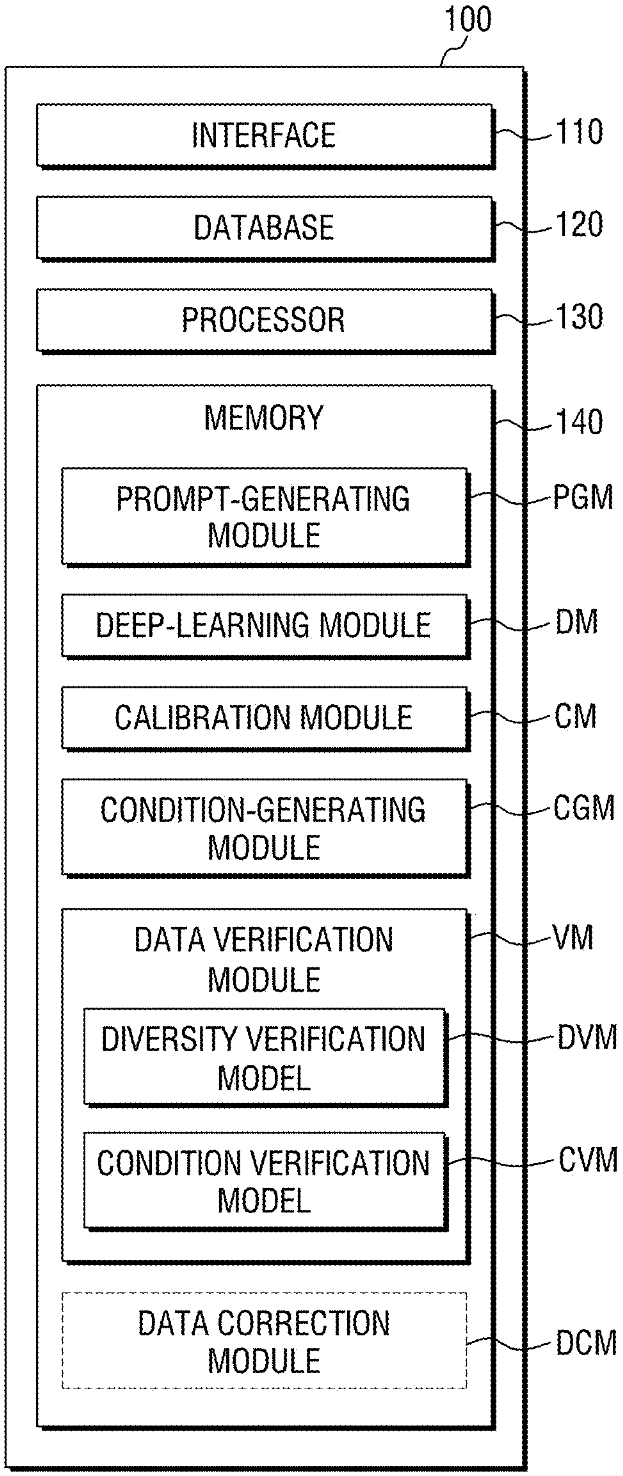
FIG. 2 is a block diagram for describing the components of a server according to some embodiments of the present disclosure.

FIG. 2 is a block diagram for describing the components of a server according to some embodiments of the present disclosure.

Referring to FIG. 2, a server 100 according to some embodiments of the present disclosure includes an interface 110, a database 120, a processor 130, and a memory 140.

In this case, a prompt-generating module (hereinafter, PGM), a deep-learning module (hereinafter, DM), a calibration module (hereinafter, CM), a condition-generating module (hereinafter, CGM), a data verification module (hereinafter, VM), or a data correction module (hereinafter, DCM) may be loaded into the memory 140 and driven (or executed) by the processor 130. According to an embodiment, the data verification module VM may include a diversity verification model (hereinafter, a DVM) or a condition verification model CVM.

Each module may be stored and used in the form of a computer program in a database 120 or storage (not shown) included in the server 100. In addition, some embodiments of the present disclosure may be implemented with some of the modules described above omitted.

Specifically, the interface 110 may transfer the data received by the server 100 from the user terminal 200 or the deep-learning server 300 to other components in the server 100. The interface 110 may be connected to an input/output device, which is provided in the server 100 and is for receiving user input. In addition, the interface 110 may include various communication modules and may perform data exchange between the user terminal 200 or the deep-learning server 300 via the communication network 400.

The database 120 performs the function of storing and managing data received via the interface 110. The database 120 may store a plurality of modules, in the form of a program, that is loaded into the memory 140 and is available. In addition, not only training data for training the deep-learning model but also weights of a neural network (i.e., neural network weights of a pre-trained deep-learning model) consisting of a plurality of layers may be stored and managed in the database 120. However, this is merely one example, and the present disclosure is not limited thereto.

The processor 130 may control at least one other component (e.g., hardware or software component) of the server 100 by executing software, and perform various data processing and operations. For example, the processor 130 may load information, commands, or data received from other components (e.g., the database 120) into the memory 140, perform operations using the loaded information, commands, or data, and store the resulting data in the database 120 or storage (not shown).

The memory 140 may load and store various data used by at least one component (e.g., the processor 130) of the server 100. For example, the data may include input data or output data for software and commands related thereto.

Therefore, the processor 130 may load and use modules or instructions related to various operations of the method of generating virtual tabular data according to some embodiments of the present disclosure on the memory 140.

Specifically, the processor 130 may generate a prompt for generating virtual tabular data desired by the user by using the prompt-generating module PGM loaded into the memory 140. Specifically, the prompt-generating module PGM may generate a first prompt for generating a table schema for the virtual tabular data, a second prompt including a calibrated table schema, and a third prompt including the calibrated table schema and table condition data.

For example, the first prompt may include a query for generating a table schema (e.g., a list and description of attributes of card payment history) and detailed conditions therefor. The second prompt may include a query for generating tabular data based on the calibrated table schema (e.g., please generate data on the card payment history, but be sure to comply with the provided table schema). The third prompt may include a query for generating tabular data based on the calibrated table schema and conditions for particular columns of the table schema (e.g., please generate data on the card payment history, but be sure to comply with the provided table schema and comply with a unary constraint and a binary constraint). However, this is merely one example, and the present disclosure is not limited thereto.

The first to third prompts generated by the prompt-generating module PGM may be sequentially transferred to the deep-learning module DM. However, the present disclosure is not limited thereto, and the configuration and transfer sequence of each prompt may be modified and implemented in a variety of ways as well.

Then, the processor 130 may generate a table schema or tabular data based on the prompts generated by the prompt-generating module PGM by using the deep-learning module DM loaded into the memory 140. At this time, the deep-learning module DM may use various types of neural network structures. For example, the deep-learning module DM may be implemented in a neural network model such as a large language model (LLM) or a pre-trained language model (PLM). However, this is merely one example, and the present disclosure is not limited thereto.

In addition, the deep-learning module DM may be used by applying weights for a pre-trained and derived neural network thereto. As described above, the weights of the deep-learning module DM or the neural network included in the deep-learning module DM may be stored and used in the database 120. Moreover, the table schema or tabular data output from the deep-learning module DM may likewise be stored, used, and managed in the database 120.

Further, the processor 130 may calibrate the table schema generated based on the first prompt in the deep-learning module DM by using the calibration module CM loaded into the memory 140. At this time, the calibration module CM may calibrate the table schema output from the deep-learning module DM by using a reference table schema stored in advance in the database 120 or received from the user terminal 200. In the following, a description will be given by taking an example in which the calibration module CM calibrates the table schema by using the reference table schema stored in advance in the database 120, for the convenience of description. The particular calibration operation of the calibration module CM will be described later below.

In addition, the processor 130 may extract table condition data applicable to the tabular data generated based on the second prompt in the deep-learning module DM by using the condition-generating module CGM loaded into the memory 140. At this time, the condition-generating module CGM may generate the table condition data by comparing the condition data received from the user terminal 200 or stored in advance in the database 120 with the tabular data generated based on the second prompt. In the following, a description will be given by taking an example in which the condition-generating module CGM generates the table condition data by using the condition data stored in advance in the database 120 for the convenience of description.

The "table condition data" output from the condition-generating module CGM may include a unary constraint or a binary constraint for each column included in the tabular data.

Here, the "unary constraint" refers to a condition of having any one of predetermined values. For example, the unary constraint may be a condition that causes cells in a particular column to have an alternative value, such as 0 or 1, Yes or No, and approval or rejection. As another example, the unary constraint may be a condition of having any one value of three predetermined options.

In addition, the "binary constraint" refers to a condition of including an operational expression with another column. For example, the value of the first column may be determined by an operation (e.g., an operation using arithmetic operations or a predetermined function) between the value of the second column and the value of the second column. However, these are merely some examples of unary or binary constraints, and the present disclosure is not limited thereto.

Furthermore, the processor 130 may perform data evaluation on the tabular data generated based on the third prompt in the deep-learning module DM by using the data verification module VM loaded into the memory 140. At this time, the data verification module VM may perform diversity verification on example data (V1 to Vn in FIG. 4) included in the tabular data, or perform verification of constraint satisfaction on the column to which the unary constraint or binary constraint is applied in the example data. A detailed description of the operation of the data verification module VM will be given later with reference to FIGS. 10 to 15.

At this time, in one embodiment of the present disclosure, the processor 130 may transfer data evaluation results output from the data verification module VM to the prompt-generating module PGM, and the prompt-generating module PGM may correct the third prompt based on the data evaluation results. Next, the processor 130 may repetitively perform an operation of applying the corrected third prompt to the deep-learning module DM and regenerating the tabular data.

Further, in another embodiment of the present disclosure, the processor 130 may perform correction on the data included in the tabular data generated based on the third prompt in the deep-learning module DM by using the data correction module DCM loaded into the memory 140. At this time, the data correction module DCM may perform an operation of correcting data that does not satisfy a predetermined reference value out of the tabular data to a value that satisfies the reference value, and this correction may be performed automatically according to a predetermined rule.

A detailed description of the process of verifying and correcting the tabular data generated based on the third prompt by the processor 130 will be given later with reference to FIGS. 12 to 15.

In the following, the operation of the method of generating virtual tabular data according to some embodiments of the present disclosure will be discussed in detail.

Figure 3:
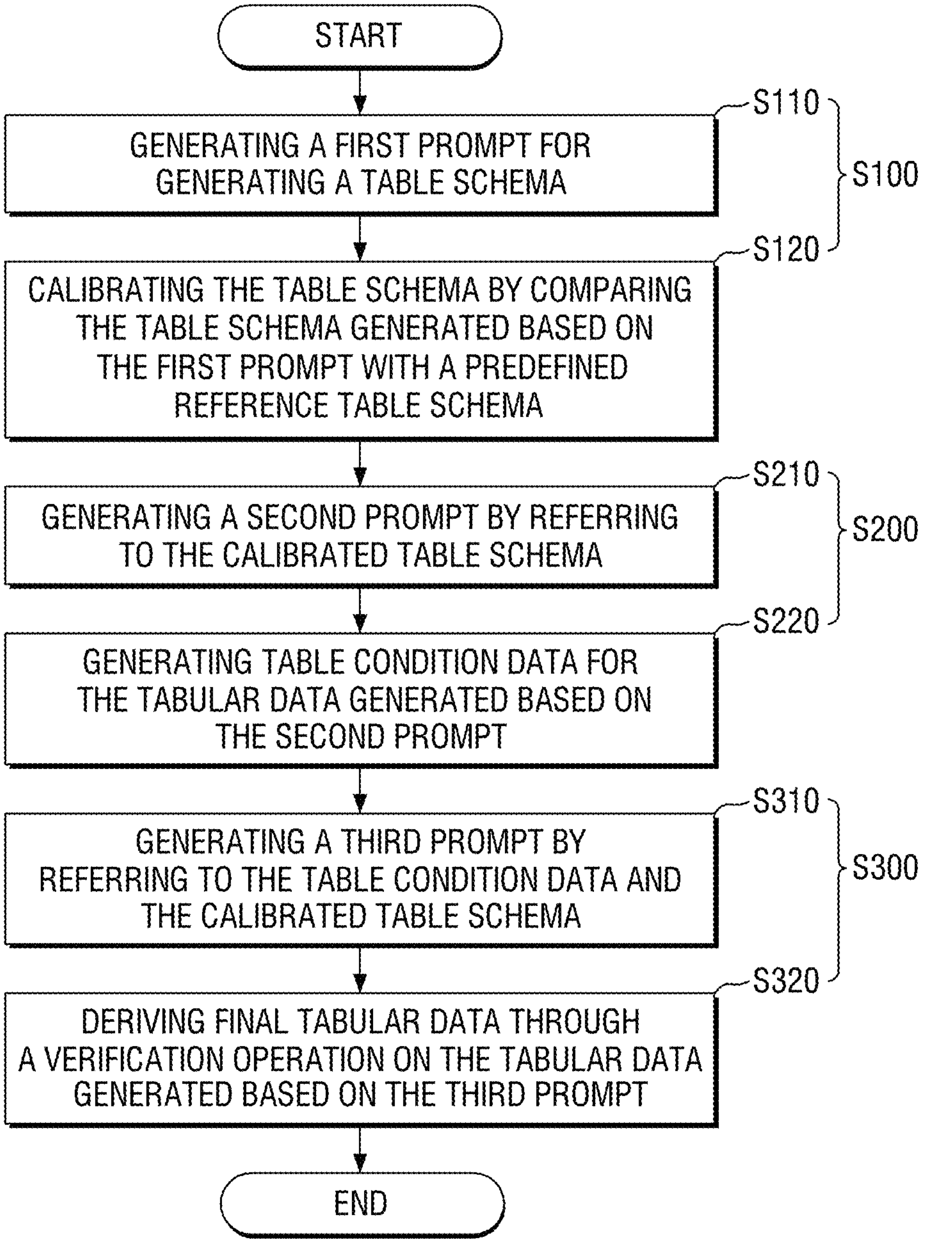
FIG. 3 is a flowchart for describing a method of generating virtual tabular data according to some embodiments of the present disclosure.

FIG. 3 is a flowchart for describing a method of generating virtual tabular data according to some embodiments of the present disclosure. FIG. 4 is a diagram for describing one example of a process of generating tabular data performed in each step of FIG. 3. In the following, a description will be given by taking an example in which the execution entity of the method of generating the virtual tabular data of the present disclosure is the server 100 or the processor 130 for the convenience of description.

Referring to FIGS. 3 and 4, in the method of generating virtual tabular data according to some embodiments of the present disclosure, the server 100 generates a first prompt for generating a table schema (S110). Here, the first prompt may include a query for generating a table schema (e.g., a list and description of attributes of card payment history).

Next, the server 100 calibrates the table schema by comparing the table schema generated based on the first prompt with a predefined reference table schema (S120). For example, S in <A1> of FIG. 4 represents the table schema generated with the first prompt as input, and S' in <A2> of FIG. 4 represents the calibrated table schema.

At this time, if the table schema generated based on the first prompt does not include an item of each column included in the predefined reference table schema, the server 100 may calibrate the table schema to include the corresponding item. A detailed description thereof will be given later with reference to FIGS. 5 and 6.

Next, the server 100 generates a second prompt by referring to the calibrated table schema (S210). Here, the second prompt may include a query for generating tabular data based on the calibrated table schema (e.g., please generate data on the card payment history, but be sure to comply with the provided table schema).

Next, the server 100 generates table condition data for first tabular data generated based on the second prompt (S220). For example, <A2> of FIG. 4 shows the first tabular data including the calibrated table schema S' and example data V1 therefor. Further, <A3> of FIG. 4 discloses columns to which table condition data (e.g., a unary constraint Cu1 or binary constraints Cb1 to Cb3) applicable to the calibrated table schema S' is applied.

Next, the server 100 generates a third prompt by referring to the table condition data and the calibrated table schema (S310). Here, the third prompt may include a query for generating tabular data based on the calibrated table schema and conditions (i.e., table condition data) for particular columns of the table schema (e.g., please generate data on the card payment history, but be sure to comply with the provided table schema and comply with a unary constraint and a binary constraint).

Next, the server 100 derives final tabular data through a verification operation on second tabular data generated based on the third prompt (S320). For example, <A3> of FIG. 4 shows the second tabular data including the calibrated table schema S' and a plurality of example data V1 to Vn to which the table condition data (e.g., the unary constraint Cu1 or binary constraints Cb1 to Cb3) is applied.

In the present disclosure, the server 100 can generate highly accurate tabular data requested by the user by automatically updating the prompts for generating virtual tabular data over a plurality of times in the process of sequentially performing each of the steps described above.

Thereby, the present disclosure can increase the work efficiency of developers or workers and optimize the resources required for developing new services or analyzing existing services by omitting or automating the data collection process required for developing new services.

In the following, a method of calibrating a table schema (i.e., step S100 of FIG. 3) according to some embodiments of the present disclosure will be discussed in detail.

Figure 5:
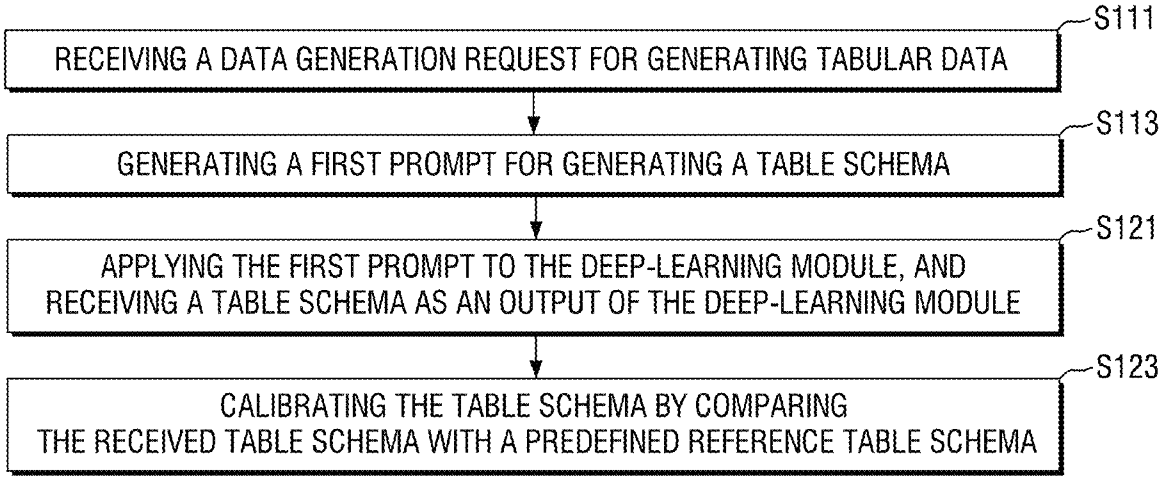
FIG. 5 is a flowchart for describing step S100 of FIG. 3.
Figure 6:
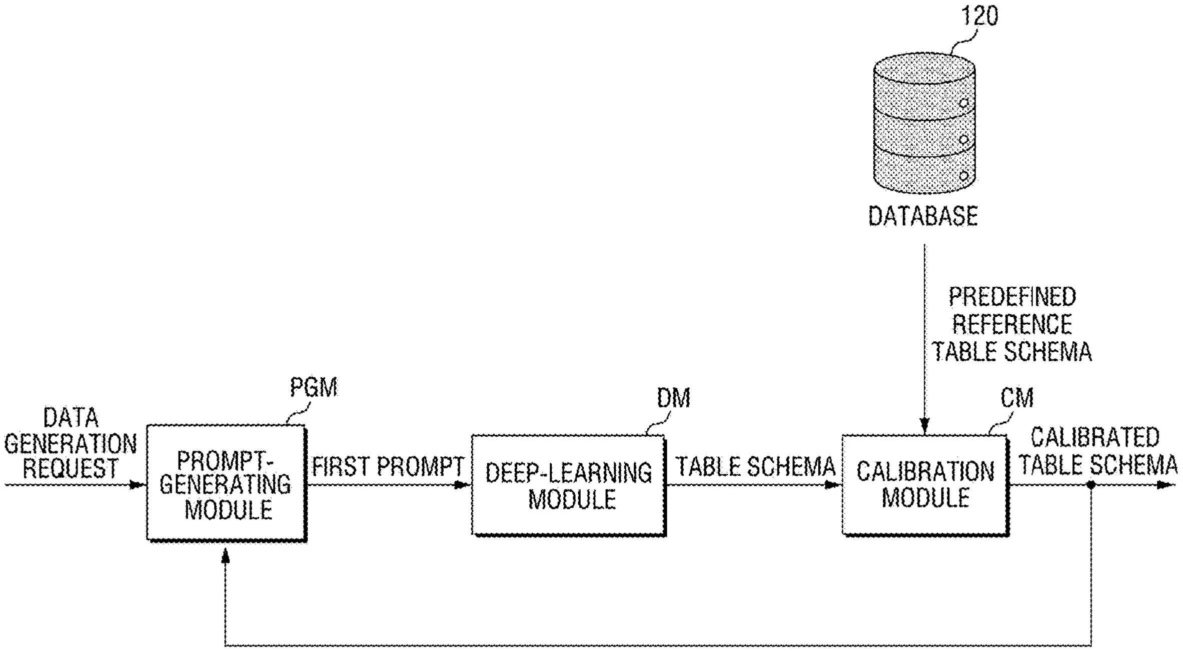
FIG. 6 is a block diagram for describing the flowchart of FIG. 5.
Figure 7:
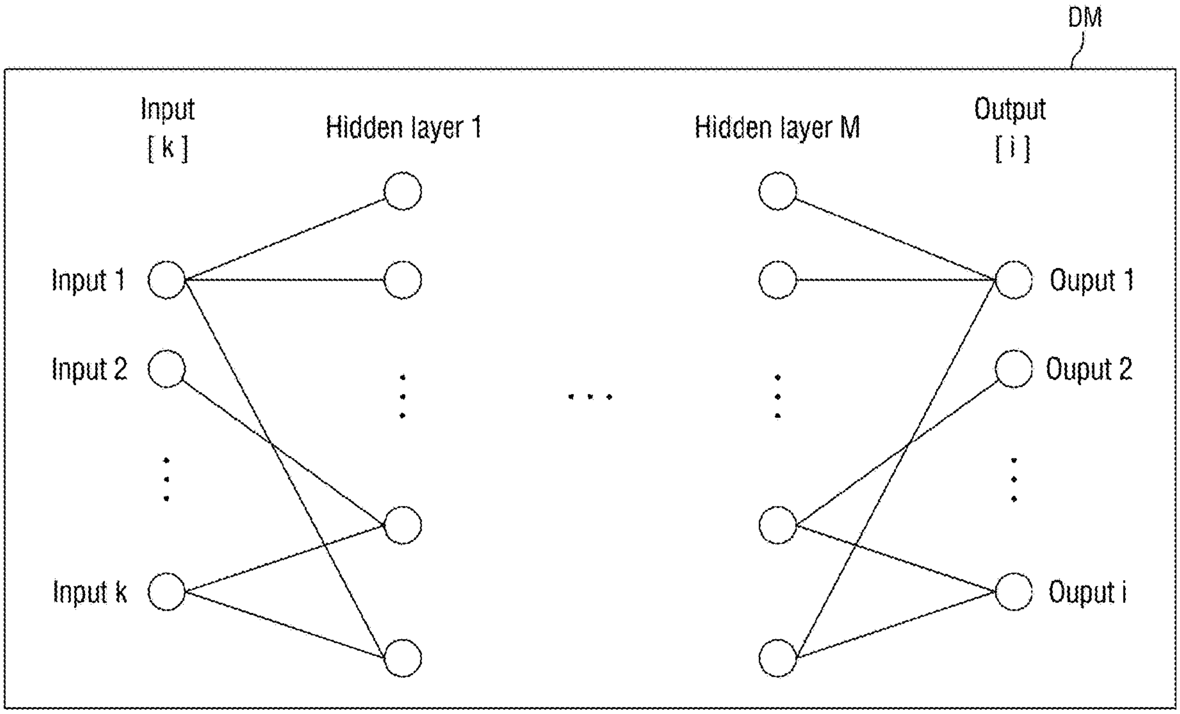
FIG. 7 is a diagram for describing a neural network model applicable to the deep-learning module of FIG. 6.

FIG. 5 is a flowchart for describing step S100 of FIG. 3. FIG. 6 is a block diagram for describing the flowchart of FIG. 5. FIG. 7 is a diagram for describing a neural network model applicable to the deep-learning module of FIG. 6.

Referring to FIGS. 5 and 6, the server 100 may receive a data generation request including information on tabular data desired by the user from the user terminal 200 (S111). Here, the user terminal 200 may receive as input a data generation request including information on the type (e.g., financial data), format (e.g., tabular data), or conditions (e.g., including amounts and point columns) of data desired by the user from the user, and transfer the received data generation request to the server 100.

Next, the processor 130 of the server 100 inputs the received data generation request into the prompt-generating module PGM, and receives a first prompt generated based on the information included in the data generation request as an output of the prompt-generating module PGM (S113).

Next, the processor 130 applies the generated first prompt to the deep-learning module DM, and receives a table schema as an output of the deep-learning module DM (S121).

At this time, the deep-learning module DM used in some embodiments of the present disclosure may output a table schema or tabular data corresponding to the input prompt by using an artificial neural network pre-trained based on big data. Here, the tabular data refers to data including a table schema and example data generated according to the format of the table schema.

Specifically, the deep-learning module DM may be implemented in a neural network structure, and train the artificial neural network by using mapping values to separate parameters derived based on the input data. At this time, the deep-learning module DM may perform machine learning on the parameters input as learning factors.

In a more detailed description, a deep-learning technique, which is a kind of machine learning, goes down to a deep level and is subjected to learning in multiple stages based on data.

Deep learning refers to a set of machine learning algorithms that extract core data from a plurality of data while moving up the stages.

The deep-learning module DM may use a variety of known artificial neural network structures. For example, the deep-learning module DM may use structures such as a convolutional neural network (CNN), a recurrent neural network (RNN), a deep belief network (DBN), a graph neural network (GNN), and a transformer.

Further, the training of the artificial neural network by the deep-learning module DM may be achieved by calibrating the weights of connection lines between nodes (and calibrating bias values as well if necessary) so that a desired output is obtained for a given input. In addition, the artificial neural network may continuously update the weight values by training. Moreover, methods such as backpropagation may be used for training the artificial neural network.

In this case, the memory 140 of the server 100 may be equipped with an artificial neural network pre-trained with machine learning. In other words, the memory 140 may store data used for machine learning, result data, and the like.

In some embodiments of the present disclosure, the deep-learning module DM may include a deep-learning model based on a transformer including an encoder EN and a decoder DE or a large language model. However, these are merely some examples of the present disclosure, and the present disclosure is not limited thereto.

Referring to FIG. 7, the deep-learning module DM includes an input layer Input with prompts in the form of text as input nodes, an output layer Output with virtual tabular data as output nodes, and M hidden layers arranged between the input layer and the output layer.

Here, weights may be set for the edges that connect the nodes of the respective layers. The presence or absence of these weights or edges may be added, removed, or updated during the training process. Therefore, the weights of the nodes and edges arranged between the k input nodes and the i output nodes may be updated through the training process.

Before the deep-learning module DM performs training, all nodes and edges may be set to initial values. However, if information is input cumulatively, the weights of the nodes and edges may be changed, and in this process, matching may be made between the parameters input as the training factors (i.e., character recognition data) and the values assigned to the output nodes (i.e., summary data).

Additionally, if a cloud server (not shown) (e.g., the deep-learning server 300) is used, the deep-learning module DM may receive and process a large number of parameters. In this case, the operation of the deep-learning module DM may be implemented in conjunction with the server 100 and/or a separate cloud server (not shown) in some embodiments of the present disclosure. Therefore, the deep-learning module DM may perform training based on an immense amount of data.

The weights of the nodes and edges between the input and output nodes constituting the deep-learning module DM may be updated by the training process of the deep-learning module DM. Moreover, the parameters output from the deep-learning module DM may be further expanded to various data, in addition to the summary data, as a matter of course.

Both semi-supervised learning and supervised learning may be used as the machine learning method used in the deep-learning module DM. In addition, the deep-learning module DM may be controlled to automatically update the artificial neural network structure for outputting more accurate tabular data after training according to the settings.

Referring again to FIGS. 5 and 6, the processor 130 compares the table schema output from the deep-learning module DM with the reference table schema stored in advance in the database 120 by using the calibration module CM (S123). Here, the reference table schema may define items that must be included in the tabular data. The reference table schema may be defined in advance by an expert, stored in the database 120, and used, or may be received separately from the user terminal 200 and used, as a matter of course.

At this time, if the table schema received from the deep-learning module DM does not include an item included in the reference table schema, the calibration module CM may calibrate the table schema to include the corresponding item.

For example, if the table schema S generated by the deep-learning module DM consists only of the items of Date, Amount, and Merchant as disclosed in <A1> of FIG. 4, and the reference table schema predefined in the database 120 consists of Date, Amount, Merchant, Inquiry Type, Online Pay, Regular Pay, Ratio of Point, and Point, then the calibration module CM can calibrate the calibrated table schema S' to include all of the respective items of the reference table schema. However, this is merely one example and the present disclosure is not limited thereto.

In the following, a method of generating table condition data (i.e., step S200 of FIG. 3) according to some embodiments of the present disclosure will be discussed in detail.

Figure 8:
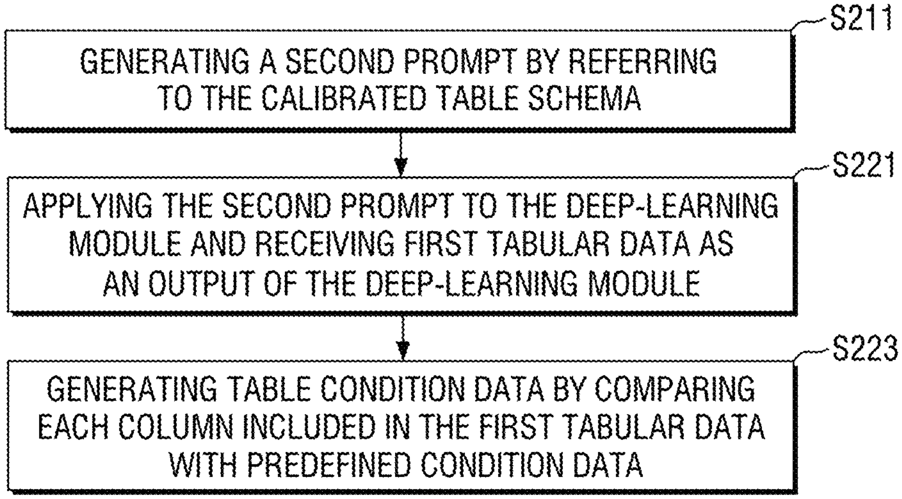
FIG. 8 is a flowchart for describing step S200 of FIG. 3.
Figure 9:
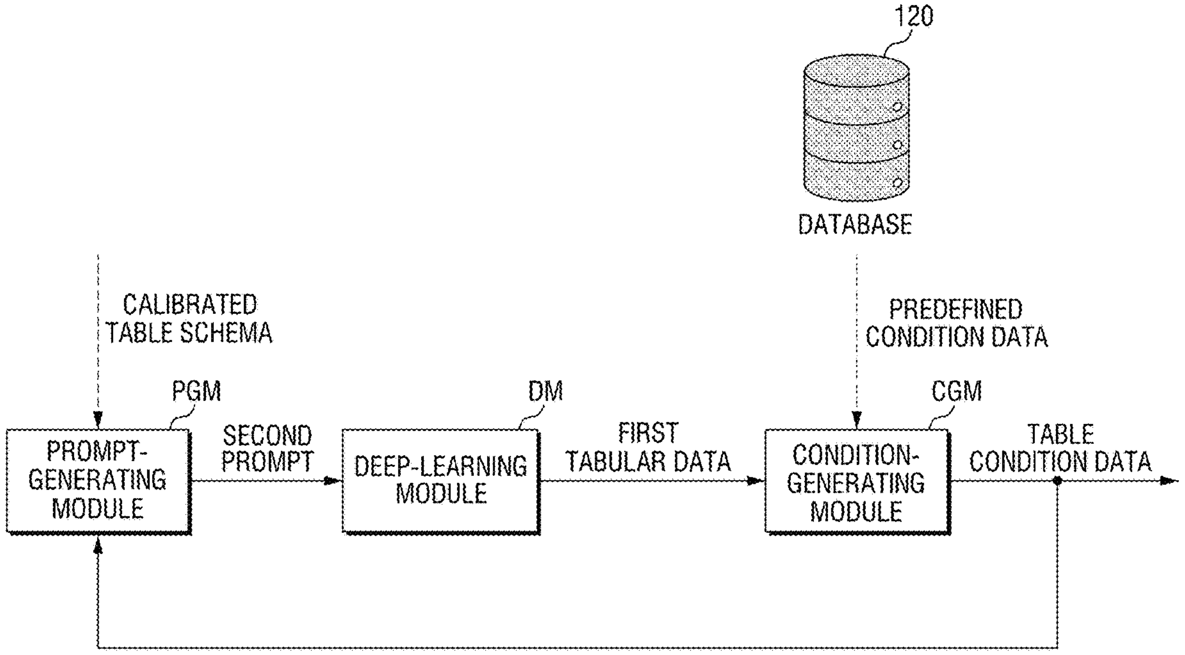
FIG. 9 is a block diagram for describing the flowchart of FIG. 8.

FIG. 8 is a flowchart for describing step S200 of FIG. 3. FIG. 9 is a block diagram for describing the flowchart of FIG. 8.

Referring to FIGS. 8 and 9, the processor 130 generates a second prompt using the prompt-generating module PGM by referring to the table schema calibrated in step S100 (S211). At this time, although not explicitly shown in the drawing, the prompt-generating module PGM may generate the second prompt by referring to the calibrated table schema and the data generation request received from the user terminal 200 together. However, this is merely one example, and the present disclosure is not limited thereto.

Next, the processor 130 applies the second prompt to the deep-learning module DM and receives first tabular data as an output of the deep-learning module DM (S221). Here, the first tabular data may include first example data V1 generated according to the format of the calibrated table schema S' (<A2> of FIG. 4).

Next, the processor 130 compares each column included in the first tabular data with predefined condition data by using the condition-generating module CGM and generates table condition data (S223). At this time, the table condition data includes a unary constraint and/or a binary constraint for each column included in the tabular data.

At this time, the condition-generating module CGM may use condition data stored in advance in the database 120 or condition data separately received from the user terminal 200. Here, the condition data may be data in which a plurality of items (or columns) and whether a condition (i.e., the unary constraint or binary constraint) is applied to the corresponding items are stored in a table format. The condition-generating module CGM may generate table condition data by comparing the condition data with each column included in the first tabular data and determining which condition to apply to which column of the first tabular data.

For example, the table condition data may include a unary constraint that causes the column of Inquiry Type to have a value of either online or offline. In addition, the table condition data may include a binary constraint that causes the columns of Amount, Rate of Point, and Point to be cross-referenced by an operational expression (see <A3> in FIG. 4). However, this is merely one example, and the present disclosure is not limited thereto.

In the following, a method of generating second tabular data and determining final tabular data through a verification operation (i.e., step S300 in FIG. 3) according to some embodiments of the present disclosure will be discussed in detail.

Figure 10:
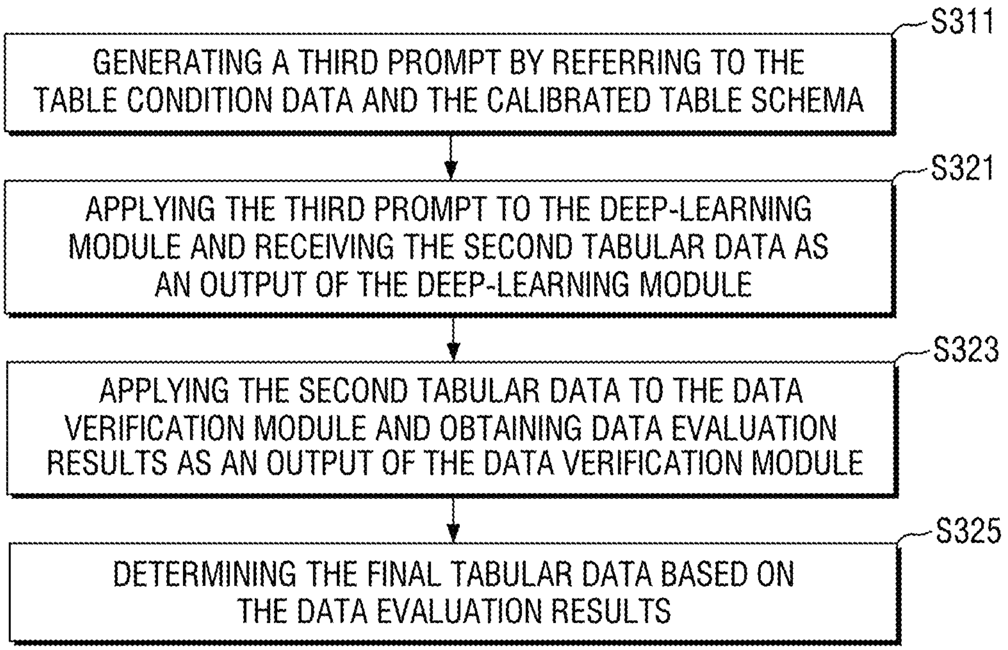
FIG. 10 is a flowchart for describing step S300 of FIG. 3.
Figure 11:
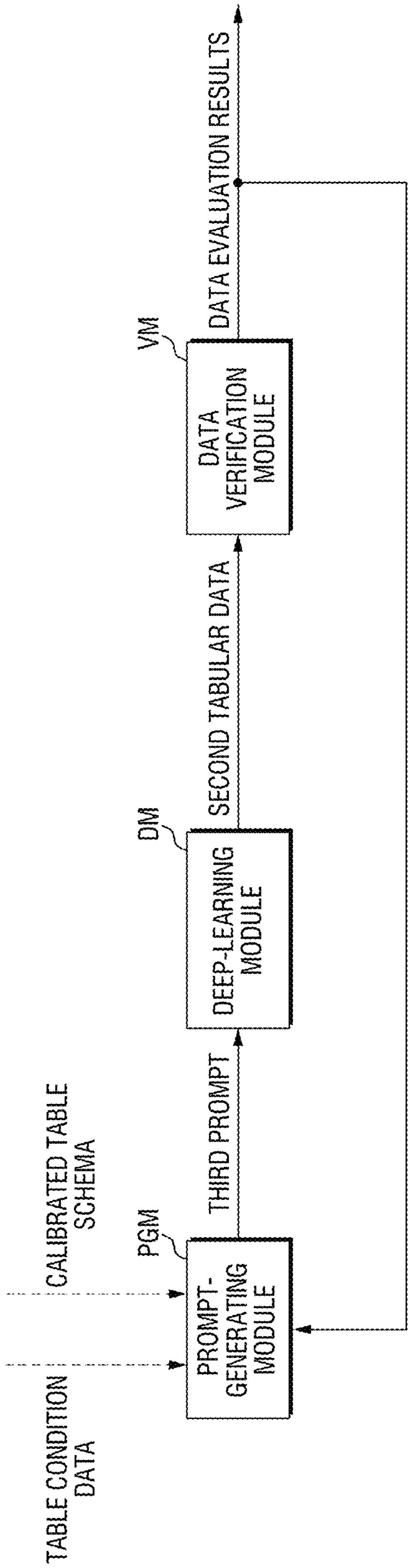
FIG. 11 is a block diagram for describing the flowchart of FIG. 10.

FIG. 10 is a flowchart for describing step S300 of FIG. 3. FIG. 11 is a block diagram for describing the flowchart of FIG. 10.

Referring to FIGS. 10 and 11, the processor 130 generates a third prompt using the prompt-generating module PGM by referring to the table schema calibrated in step S100 and the table condition data derived in step S200 (S311). At this time, although not explicitly shown in the drawing, the prompt-generating module PGM may generate the third prompt by referring to the calibrated table schema, the table condition data, and the data generation request received from the user terminal 200 together. However, this is merely one example, and the present disclosure is not limited thereto.

Next, the processor 130 applies the third prompt to the deep-learning module DM and receives second tabular data as an output of the deep-learning module DM (S321). Here, the second tabular data may include a plurality of example data V1 to Vn generated according to the format of the calibrated table schema S' (<A3> of FIG. 4). In this case, the second tabular data (<A3> of FIG. 4) may include a greater number of example data than the first tabular data (<A2> of FIG. 4).

Next, the processor 130 applies the second tabular data to the data verification module VM and obtains data evaluation results as an output of the data verification module VM (S323). At this time, the data verification module VM may perform diversity verification on example data included in the second tabular data, and perform verification of constraint satisfaction on the column to which the unary constraint or binary constraint is applied in the example data. Therefore, the data evaluation results may include a first evaluation value for diversity, a second evaluation value for whether the unary constraint is satisfied, and/or a third evaluation value for whether the binary constraint is satisfied.

Next, the processor 130 determines final tabular data based on the obtained data evaluation results (S325).

In the following, a process of determining the final tabular data based on the data evaluation results in some embodiments of the present disclosure will be described in detail.

Figure 12:
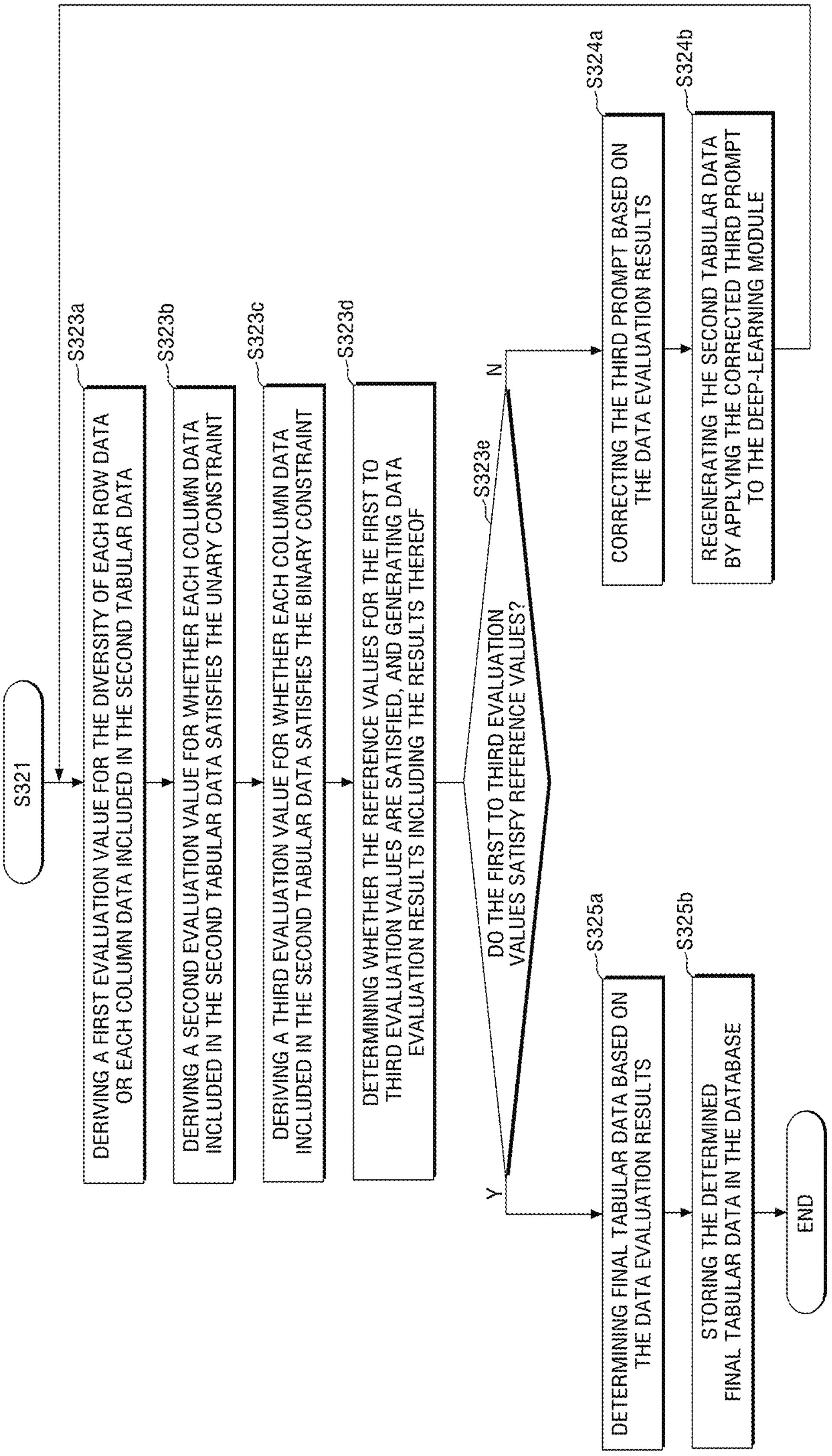
FIG. 12 is a flowchart for describing one embodiment of steps S323 and S325 of FIG. 10.
Figure 13:
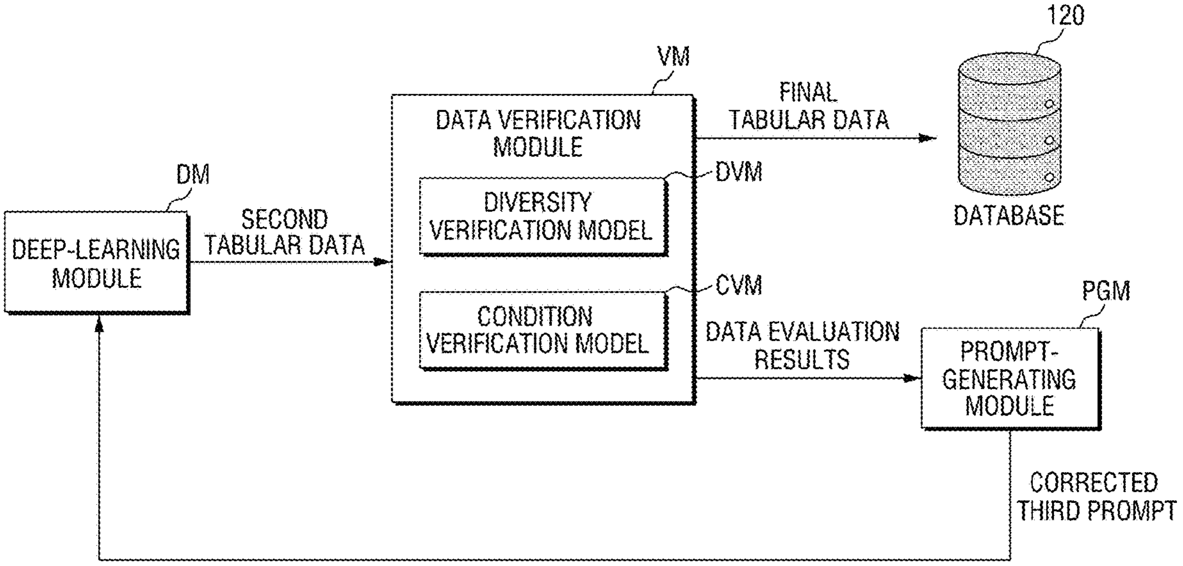
FIG. 13 is a block diagram for describing the flowchart of FIG. 12.

FIG. 12 is a flowchart for describing one embodiment of steps S323 and S325 of FIG. 10. FIG. 13 is a block diagram for describing the flowchart of FIG. 12.

Referring to FIGS. 12 and 13, the processor 130 first transfers the second tabular data obtained from the deep-learning module DM to the data verification module VM.

At this time, the data verification module VM derives a first evaluation value for the diversity of each row data or each column data included in the second tabular data by using the diversity verification model DVM (S323*a*).

Specifically, in one embodiment, the data verification module VM may derive it by concatenating all the values of each row data included in the second tabular data (e.g., using a concat function), embedding the concatenated values in a particular domain, then extracting the uniformity of the embedded values, and normalizing them using a normalization function (e.g., a Sigmoid function). Thereby, the data verification module VM may derive the diversity between instances included in each row data as the first evaluation value.

Further, in another embodiment, the data verification module VM may derive the diversity of each column data included in the second tabular data (i.e., the diversity between attributes in an instance) as the first evaluation value. Here, the first evaluation value can be derived by the following <Mathematical Expression 1>:

$$\mathcal{H} = -\sum_{i \in I} p_i * \log p_i \qquad \langle\text{Mathematical Expression 1}\rangle$$

Here, $\mathcal{H}$ denotes the first evaluation value representing the degree of diversity of the data, I denotes a set of unique values corresponding to a particular column, i denotes a value included in the corresponding set, and $p_i$ denotes the probability that each i appears.

In addition, the data verification module VM derives a second evaluation value for whether each column data included in the second tabular data satisfies the unary constraint by using the condition verification model CVM (S323*b*). Here, the second evaluation value can be derived by the following <Mathematical Expression 2>:

$$\rho = \frac{1}{K^u} \sum_{c_j^u \in C^u} \mathbb{1}\left(\Psi\left(\hat{v}\bullet, c_j^u\right)\right) \qquad \langle\text{Mathematical Expression 2}\rangle$$

Here, ρ denotes the second evaluation value for whether the unary constraint is satisfied, $K^u$ denotes the number of unary constraint items, $C^u$ denotes a set of values to which the unary constraint is applied, Ψ denotes a unary operator that checks the existence of a predetermined unary item, and $$C_j^u$$

denotes each value to which the unary constraint is applied.

In addition, the data verification module VM derives a third evaluation value for whether each column data included in the second tabular data satisfies the binary constraint by using the condition verification model CVM (S323*c*). Here, the third evaluation value can be derived by the following <Mathematical Expression 3>:

$$\tau = \frac{1}{K^b} \sum_{c_j^b \in C^b} \mathbb{1}\left(c_j^b\right) \qquad \langle\text{Mathematical Expression 3}\rangle$$

Here, τ denotes the third evaluation value for whether the binary constraint is satisfied, $K^b$ denotes the number of binary constraint items, $C^b$ denotes a set of values to which the binary constraint is applied, and $$c_j^b$$

denotes each value to which the binary constraint is applied.

Next, the data verification module VM determines whether the reference values for the first to third evaluation values are satisfied, and generates data evaluation results including the results thereof (S323*d*). At this time, the data verification module VM determines whether the first to third evaluation values and each evaluation value satisfy predetermined reference values (or thresholds), and generates data evaluation results including the results thereof.

At this time, the steps S323*a* to S323*c* described above may be performed in sequence or in parallel in the data verification module VM, and may be implemented by omitting or modifying some of them. In addition, the data verification module VM may of course perform step S323*d* based on the evaluation values derived in the steps described above.

Next, the processor 130 checks whether the first to third evaluation values satisfy predetermined reference values by referring to the data evaluation results (S323*e*). At this time, the processor 130 may determine whether the reference values are satisfied based on whether each of the first to third evaluation values satisfies all of the respective predetermined reference values, or whether a predetermined number or more of evaluation values of the first to third evaluation values satisfy the respective reference values.

If the first to third evaluation values do not satisfy the reference values, the processor 130 may perform an operation of regenerating the second tabular data. At this time, the processor 130 may regenerate all or part of the second tabular data.

If only part of the second tabular data is regenerated, the processor 130 may store only the data that passed the reference values in the database 120, discard the rest of the data, and then generate the second tabular data again.

Specifically, the processor 130 transfers the data evaluation results received from the data verification module VM to the prompt-generating module PGM, and the prompt-generating module PGM corrects the third prompt based on the data evaluation results (S324*a*). At this time, the prompt-generating module PGM may correct the third prompt to include a conditional statement for replacement or exclusion of data that does not satisfy the reference values. However, this is merely one example, and the present disclosure is not limited thereto.

Next, the processor 130 regenerates the second tabular data by applying the corrected third prompt to the deep-learning module DM again (S324*b*).

Next, the processor 130 applies the regenerated second tabular data to the data verification module VM again, and re-obtains data evaluation results as an output of the data verification module VM. At this time, the operation of the data verification module VM may be substantially the same as the steps S323*a* to S323*d* described above.

Next, the processor 130 checks whether the first to third evaluation values satisfy the predetermined reference values by referring to the re-obtained data evaluation results.

On the other hand, if the first to third evaluation values satisfy the predetermined reference values, the processor 130 can determine the second tabular data as the final tabular data (S325*a*) and store the determined final tabular data in the database 120 (S325*b*).

In addition, the operation of generating the second tabular data described above may be performed repetitively until the final tabular data is determined, as a matter of course.

Figure 14:
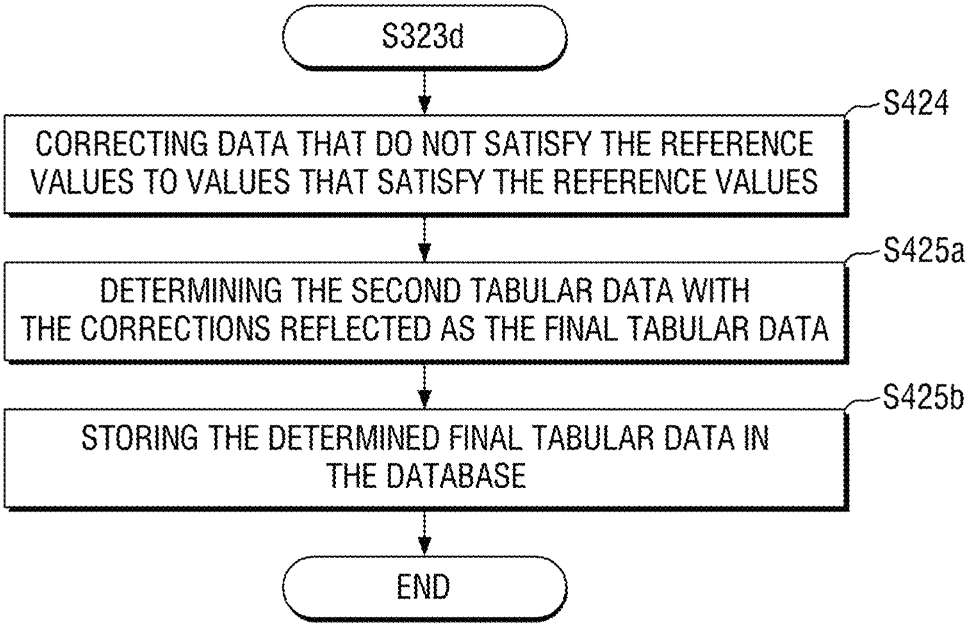
FIG. 14 is a flowchart for describing another embodiment of step S325 of FIG. 10.
Figure 15:
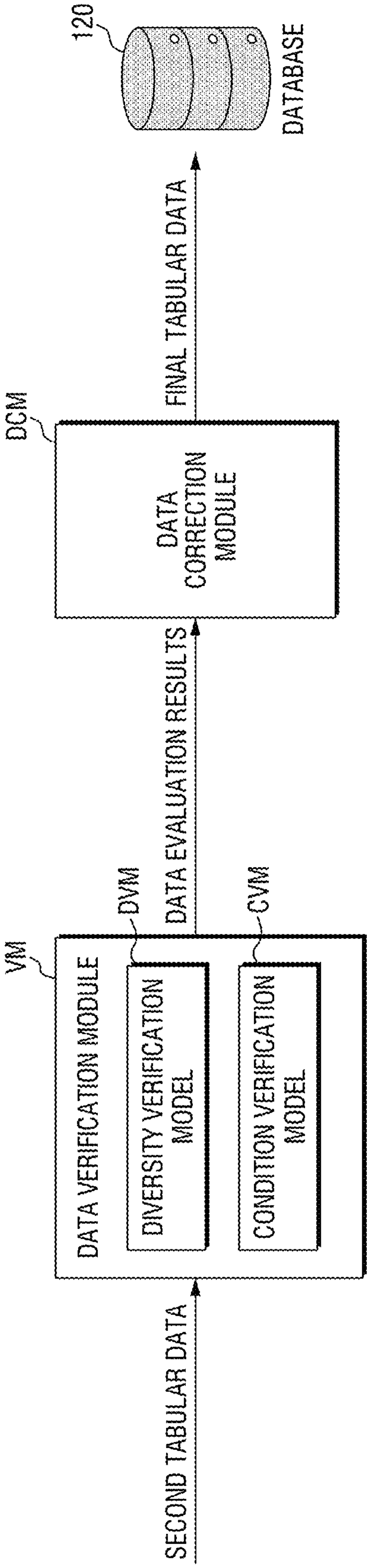
FIG. 15 is a block diagram for describing the flowchart of FIG. 14.

FIG. 14 is a flowchart for describing another embodiment of step S325 of FIG. 10. FIG. 15 is a block diagram for describing the flowchart of FIG. 14. In the following, the contents overlapping with what has been described above will be omitted, and a description will be provided mainly focusing on the differences.

Referring to FIGS. 14 and 15, the processor 130 performs steps S323*a* to S323*d* by using the data verification module VM in another embodiment of the present disclosure.

Next, the processor 130 transfers the data evaluation results received from the data verification module VM to the data correction module DCM.

At this time, the data correction module DCM performs correction on data that does not satisfy the reference value included in the second tabular data (S424). Specifically, the data correction module DCM corrects values that do not satisfy the reference value to values that satisfy the reference value. At this time, the data correction module DCM can correct values that do not satisfy the reference value to values that satisfy the reference value according to predetermined rules.

Next, the processor 130 may determine the second tabular data reflecting the corrections performed by the data correction module DCM as the final tabular data (S425*a*), and store the determined final tabular data in the database 120 (S425*b*).

Therefore, the virtual tabular data generated through the method described above can generate virtual data that can have accuracy and diversity higher than the predetermined reference value and can reflect the characteristics of sensitive information data of customers through the data verification and correction process. Thereby, the present disclosure can solve the security issue of sensitive information data, and at the same time, generate data in a form desired by the user and utilize this to operate business models.

In summary, some embodiments of the present disclosure can automatically generate highly accurate virtual data that can replace data containing sensitive information on customers, and can generate virtual data to fit the form of a table schema desired by the user. Thereby, developers or workers can use the present disclosure to test or train business models applicable to new services, and can instantly generate and utilize highly accurate virtual data.

Figure 16:
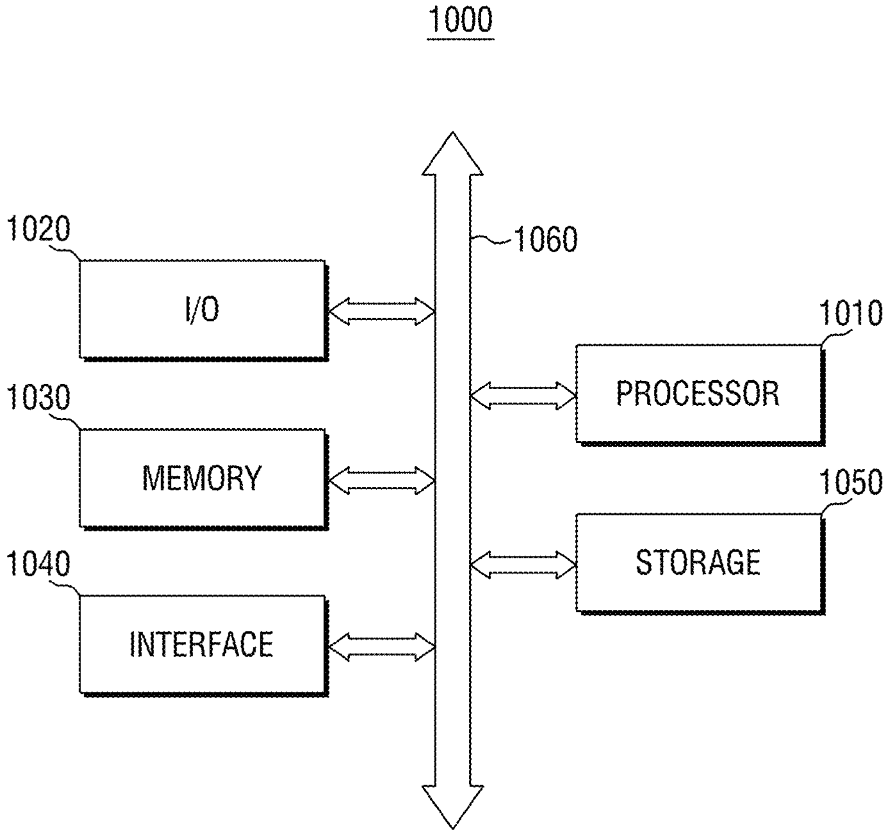
FIG. 16 is a diagram for describing hardware implementation of a device or system that performs a method of generating virtual tabular data according to some embodiments of the present disclosure.

FIG. 16 is a diagram for describing hardware implementation of a device or system that performs a method of generating virtual tabular data according to some embodiments of the present disclosure.

Referring to FIG. 16, a server 100 that performs the method of generating virtual tabular data according to some embodiments of the present disclosure may be implemented in an electronic device 1000. The electronic device 1000 may include a processor 1010, an input/output device (I/O) 1020, a memory 1030, an interface 1040, a storage 1050, and a bus 1060. The processor 1010, the input/output device 1020, the memory 1030, the interface 1040, and/or the storage 1050 may be coupled to each other via the bus 1060. The bus 1060 corresponds to a path through which data is moved.

Specifically, the processor 1010 may include at least one of a CPU (central processing unit), an MPU (microprocessor unit), an MCU (microcontroller unit), a GPU (graphic processing unit), a microprocessor, a digital signal processor, a microcontroller, an application processor (AP), and logic devices capable of performing functions similar thereto.

The input/output device 1020 may include at least one of a keypad, a keyboard, a touchscreen, and a display device.

The memory 1030 may be loaded with data and/or programs, etc. In this case, the memory 1030 is an operating memory for improving the operation of the processor 1010 and may include high-speed DRAM and/or SRAM, etc. The memory 1030 may include one or more volatile memory devices such as DDR SDRAM (double data rate static DRAM) and SDR SDRAM (single data rate SDRAM), and/or one or more nonvolatile memory devices such as EEPROM (electrically erasable programmable ROM), and flash memory.

The interface 1040 may perform the function of transmitting data to or receiving data from a communication network. The interface 1040 may be of a wired or wireless form. For example, the interface 1040 may include an antenna or a wired/wireless transceiver.

The storage 1050 may store and preserve data and/or programs, etc. The storage 1050 may include one or more nonvolatile memory devices such as a solid-state drive (SSD), a hard drive, and flash memory. The storage 1050 in the present disclosure may store a computer program consisting of instructions for performing the method of generating virtual tabular data.

Alternatively, the server 100 and the deep-learning server 300 in accordance with embodiments of the present disclosure may each be a system formed by connecting a plurality of electronic devices 1000 to each other via a network. In such a case, each module or combinations of modules may be implemented in the electronic device 1000. However, the present embodiment is not limited thereto.

Additionally, the server 100 may be implemented in at least one of a workstation, a data center, an Internet data center (IDC), a direct-attached storage (DAS) system, a storage area network (SAN) system, a network-attached storage (NAS) system, and a RAID (redundant array of inexpensive disks, or redundant array of independent disks) system, but the present embodiment is not limited thereto.

Further, the server 100 may transmit data over a network. The network may include a network based on wired Internet technology, wireless Internet technology, and short-range communication technology. The wired Internet technology may include, for example, at least one of a local area network (LAN) and a wide area network (WAN).

The wireless Internet technology may include at least one of, for example, wireless LAN (WLAN), DMNA (Digital Living Network Alliance), WiBro (Wireless Broadband), WiMAX (World Interoperability for Microwave Access), HSDPA (High Speed Downlink Packet Access), HSUPA (High Speed Uplink Packet Access), IEEE 802.16, LTE (Long Term Evolution), LTE-A (Long Term Evolution-Advanced), WMBS (Wireless Mobile Broadband Service), and 5G NR (New Radio) technology. However, the present embodiment is not limited thereto.

The short-range communication technology may include at least one of, for example, Bluetooth, RFID (Radio Frequency Identification), IrDA (Infrared Data Association), UWB (Ultra-Wideband), ZigBee, NFC (Near Field Communication), USC (Ultra Sound Communication), VLC (Visible Light Communication), Wi-Fi, Wi-Fi Direct, and 5G NR (New Radio). However, the present embodiment is not limited thereto.

The server 100 communicating over the network may comply with technical standards and standard communication methods for mobile communications. For example, the standard communication methods may include at least one of GSM (Global System for Mobile communication), CDMA (Code Division Multiple Access), CDMA 2000 (Code Division Multiple Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTEA (Long Term Evolution-Advanced), and 5G NR (New Radio). However, the present embodiment is not limited thereto.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A method of generating virtual tabular data, performed on a server using a deep-learning module, comprising:

generating a first prompt for generating a table schema;

applying the first prompt to the deep-learning module and receiving the table schema as an output of the deep-learning module;

calibrating the table schema by comparing the table schema generated based on the first prompt with a predefined reference table schema;

generating a second prompt by referring to the calibrated table schema;

applying the second prompt to the deep-learning module and receiving first tabular data as an output of the deep-learning module;

generating table condition data for the first tabular data by comparing each column included in the first tabular data with predefined condition data;

generating a third prompt by referring to the table condition data and the calibrated table schema; and deriving final tabular data through a verification operation on second tabular data generated based on the third prompt.

2. The method of claim 1, wherein the calibrating the table schema comprises:

comparing the table schema with the predefined reference table schema; and calibrating the table schema to include an item included in the predefined reference table schema in response to determining that the table schema does not include the item.

3. The method of claim 1, wherein the generating the first prompt comprises:

receiving a data generation request including information on tabular data desired by a user from a user terminal linked with the server; and generating the first prompt based on information included in the data generation request.

4. The method of claim 3, wherein the generating the second prompt comprises generating the second prompt by referring to the calibrated table schema and the data generation request together, and the generating the third prompt comprises generating the third prompt by referring to all of the table condition data, the calibrated table schema, and the data generation request.

5. The method of claim 1, wherein the table condition data comprises a unary constraint or a binary constraint for each column included in tabular data, and the unary constraint refers to a condition of having one of predetermined values, and the binary constraint refers to a condition of including an operational expression with another column.

6. The method of claim 1, wherein the deriving the final tabular data comprises:

applying the third prompt to the deep-learning module and receiving the second tabular data as an output of the deep-learning module;

applying the second tabular data to a data verification module and obtaining a data evaluation result as an output of the data verification module; and determining the final tabular data based on the data evaluation result.

7. The method of claim 6, wherein the second tabular data comprises a greater number of example data than the first tabular data, and wherein the data verification module:

performs diversity verification on the example data included in the second tabular data, and performs constraint satisfaction verification on columns to which a unary constraint or a binary constraint is applied in the example data.

8. The method of claim 6, wherein the obtaining the data evaluation result comprises:

deriving a first evaluation value for diversity of each row data or each column data included in the second tabular data;

deriving a second evaluation value for whether each column data included in the second tabular data satisfies a unary constraint;

deriving a third evaluation value for whether each column data included in the second tabular data satisfies a binary constraint; and determining whether reference values for the first to third evaluation values are satisfied, and generating the data evaluation result including a result thereof.

9. The method of claim 8, wherein the determining the final tabular data comprises:

correcting data included in the second tabular data that do not satisfy the reference values to values that satisfy the reference values; and determining the second tabular data with corrections reflected as the final tabular data.

10. The method of claim 6, further comprising:

correcting the third prompt based on the data evaluation result;

regenerating the second tabular data by applying the corrected third prompt to the deep-learning module;

applying the regenerated second tabular data to the data verification module and re-obtaining the data evaluation result as an output of the data verification module; and determining the final tabular data based on the re-obtained data evaluation result.

11. A non-transitory computer-readable recording medium having recorded thereon a program that, when executed by a processor, executes the method set forth in claim 1.

12. A server comprising:

a processor;

a memory configured to load a computer program executed by the processor; and a database configured to store data generated in an execution process of the computer program, wherein the computer program comprises:

generating a first prompt for generating a table schema;

applying the first prompt to a deep-learning module and receiving the table schema as an output of the deep-learning module;

calibrating a table schema by comparing the table schema generated based on the first prompt with a predefined reference table schema;

generating a second prompt by referring to the calibrated table schema;

applying the second prompt to the deep-learning module and receiving first tabular data as an output of the deep-learning module;

generating table condition data for the first tabular data by comparing each column included in the first tabular data with predefined condition data;

generating a third prompt by referring to the table condition data and the calibrated table schema;

deriving final tabular data through a verification operation on second tabular data generated based on the third prompt; and storing the final tabular data in the database.

13. The server of claim 12, wherein the calibrating the table schema comprises:

comparing the table schema with the predefined reference table schema; and calibrating the table schema to include an item included in the predefined reference table schema in response to determining that the table schema does not include the item, wherein the deriving the final tabular data comprises:

applying the third prompt to the deep-learning module and receiving the second tabular data as an output of the deep-learning module;

applying the second tabular data to a data verification module loaded into the memory and obtaining a data evaluation result as an output of the data verification module; and determining the final tabular data based on the data evaluation result.

14. The server of claim 13, wherein the table condition data comprises a unary constraint or a binary constraint for each column included in tabular data, and the unary constraint refers to a condition of having one of predetermined values, and the binary constraint refers to a condition of including an operational expression with another column.

15. The server of claim 13, wherein the second tabular data comprises a greater number of example data than the first tabular data, and wherein the data verification module:

performs diversity verification on the example data included in the second tabular data, and performs constraint satisfaction verification on columns to which a unary constraint or a binary constraint is applied in the example data.

16. The server of claim 13, wherein the obtaining the data evaluation result comprises:

deriving a first evaluation value for diversity of each row data or each column data included in the second tabular data;

deriving a second evaluation value for whether each column data included in the second tabular data satisfies a unary constraint;

deriving a third evaluation value for whether each column data included in the second tabular data satisfies a binary constraint; and determining whether reference values for the first to third evaluation values are satisfied, and generating the data evaluation result including a result thereof.

17. The server of claim 16, wherein the determining the final tabular data comprises:

correcting data included in the second tabular data that do not satisfy the reference values to values that satisfy the reference values; and determining the second tabular data with corrections reflected as the final tabular data.

18. The server of claim 12, wherein the generating the first prompt comprises:

receiving a data generation request including information on tabular data desired by a user from a user terminal linked with the server; and generating the first prompt based on information included in the data generation request.

19. The server of claim 18, wherein the generating the second prompt comprises generating the second prompt by referring to the calibrated table schema and the data generation request together, and the generating the third prompt comprises generating the third prompt by referring to all of the table condition data, the calibrated table schema, and the data generation request.

* * * * *